| United States Patent [19] | [11] Patent Number: 4,741,888 |
|---|---|
| Fong et al. | [45] Date of Patent: May 3, 1988 |

[54] H₂S REMOVAL FROM GAS STREAMS

[75] Inventors: Howard L. Fong, Sugarland; David A. Van Kleeck, Houston; John M. Harryman, Katy, all of Tex.

[73] Assignee: Shell Oil Company, Houston, Tex.

[21] Appl. No.: 947,730

[22] Filed: Dec. 30, 1986

[51] Int. Cl.⁴ ............................................. C01B 17/16
[52] U.S. Cl. .................... 423/226; 423/224; 423/243; 423/573 R; 423/575; 422/193; 55/73
[58] Field of Search .............. 423/220, 226, 224, 243, 423/573 R, 574 G, 575; 55/68, 69, 73; 422/193; 210/758

[56] References Cited

U.S. PATENT DOCUMENTS

| 3,068,065 | 12/1962 | Hartley et al. | 423/228 |
|---|---|---|---|
| 3,710,546 | 1/1973 | Grunewald et al. | 55/73 |
| 4,076,621 | 2/1978 | Hardison | 55/73 |
| 4,387,037 | 6/1983 | Trentham et al. | 423/575 |
| 4,419,337 | 12/1983 | Jagodzinski et al. | 423/574 R |
| 4,443,418 | 4/1984 | Lutz | 423/224 |
| 4,443,423 | 4/1984 | Olson | 423/226 |
| 4,569,832 | 2/1986 | Laufhutte | 423/220 |
| 4,603,035 | 7/1986 | Connell et al. | 423/226 |
| 4,649,032 | 3/1987 | Snavely, Jr. et al. | 423/226 |
| 4,664,902 | 5/1987 | Fong et al. | 423/226 |

OTHER PUBLICATIONS

Chemical Engineering, May 13, 1985, pp. 18–21.
Chemical Processing, Mar. 1983, (Wallace & Bacchetti) 1 page.

*Primary Examiner*—Helen M. S. Sneed
*Assistant Examiner*—A. McFarlane
*Attorney, Agent, or Firm*—Albert J. Adamcik

[57] ABSTRACT

A process for the removal of H₂S from sour gaseous streams is disclosed in which the sour gaseous stream is contacted with a solution containing solubilized iron chelates of a specified organic acid or acids. The contacting is carried out in first and second contacting zones, the first being a gas-solution mixture formation zone and the second comprising a plurality of contacting sections adapted to provide reaction of the H₂S in the sour gaseous stream with the iron in the contacting solution without plugging due to deposition of sulfur.

19 Claims, 1 Drawing Sheet

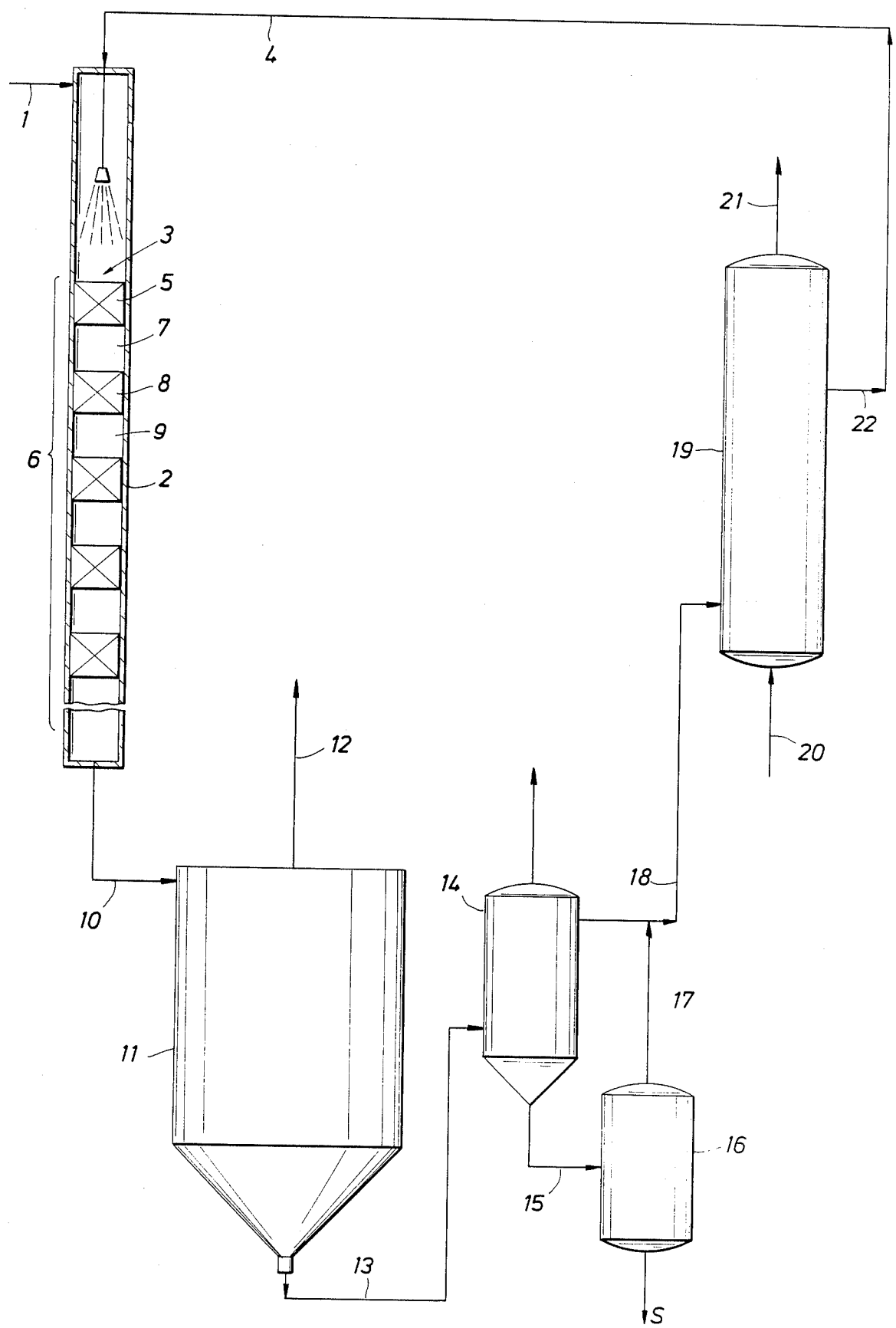

H₂S REMOVAL FROM GAS STREAMS

BACKGROUND OF THE INVENTION

The presence of significant quantities of $H_2S$ in various "sour" industrial gaseous streams poses a persistent problem. Although various procedures have been developed to remove and recover this contaminant, most such processes are deficient, for a variety of reasons.

In one cyclic method currently attracting attention, the sour gas is contacted with an aqueous polyvalent metal chelate or complex reactant solution to produce solid sulfur which is recovered either prior to or subsequent to regeneration of the reactant. Preferred reactants are iron (III) complexes in which the iron (III) forms complexes with specified organic acids and derivatives thereof.

While sour gaseous streams that contain relatively low concentrations of $H_2S$ may be treated sucessfully in a variety of ways if deep removal, e.g., greater than 95 percent removal of $H_2S$, is not required, removal of this level, or greater, demands efficiencies of operation if excessive costs of operation and materials are not to be incurred.

One scheme for carrying out the gas treatment utilizes a two-stage contacting procedure in which a venturi-shaped contacting zone is utilized as an initial or primary contacting stage to remove the bulk of the $H_2S$, and a follow-up or "clean-up" stage, such as a packed column or sparged tower, is provided for removing the remainder of the $H_2S$ in the gaseous stream. These configurations have a number of drawbacks, such as susceptibility to plugging, high gas pressure drop, and high cost. It has been determined that the $H_2S$ removal rate by at least some iron chelate or complex systems is not limited by the reaction rate of the iron with the $H_2S$, but by the rate of absorption of the $H_2S$ into the reactant solution. Accordingly, a process which provided an efficient contacting technique to insure good absorption rates of the $H_2S$ into the solution, while avoiding or minimizing plugging and high pressure drop might have great utility. The invention is such a process.

SUMMARY OF THE INVENTION

Accordingly, the invention relates to a process for removing $H_2S$ from a sour gaseous stream, of the type described, in which a solution containing solubilized iron chelate of specified organic acids and mixtures thereof is provided for the oxidation of the $H_2S$, the process being characterized by the use of a unique solution contacting technique.

Accordingly, the invention, in one embodiment, relates to a process for the removal of $H_2S$ from a sour gaseous stream comprising (a) feeding the sour gaseous stream to a first contacting zone, and intimately contacting the sour gaseous stream in said first contacting zone with an aqueous reactant solution containing solubilized ferric chelate of a specified organic acid, or mixture of said acids, and solubilized ferrous chelate of said acid or acids, at a temperature below the melting point of sulfur, and at a sufficient solution to gas ratio and conditions effective to convert $H_2S$ to sulfur and inhibit sulfur deposition, and producing a gas-solution mixture comprising sour gas and aqueous reactant solution;

(b) passing gas-solution mixture from step (a) through a plurality of enclosed contacting sections in serial flow communication in a second contacting zone, under conditions to convert $H_2S$ to sulfur and at a temperature below the melting point of sulfur, the first contacting section of said second contacting zone comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; the second contacting section through which gas-solution mixture is passed comprising an enclosed mixing section operative to or adapted to allow radial mixing of gas-solution mixture and redistribution of solution in gas, and to inhibit plugging due to sulfur formation; the third contacting section through which gas solution mixture is passed comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; and producing a gas-reactant solution mixture containing solid sulfur in said second contacting zone, the reactant solution of said gas-reactant solution mixture having a reduced content of solubilized ferric chelate of said acid or acids and the gas of said mixture having a reduced $H_2S$ content;

(c) separating the gas having reduced $H_2S$ content from gas-reactant solution mixture produced in step (b). The gas having reduced $H_2S$ content may be separated from the solution in the second contacting zone, but is preferably separated in a separate vessel or step. If further purification is necessary or desired, the contacting procedure of steps (a) and (b) may be repeated, or other contacting techniques or schemes, such as use of a sparged tower or towers, may be used. In such cases, appropriate measures will be taken for separation of the further purified gas and regeneration of the aqueous reactant solution(s) employed. For example, the solution produced by step (c) and additional solution from further purification or contacting steps may be combined and regenerated in a single regeneration step, sulfur removal being accomplished prior to or after the regeneration. Preferably, however, the gas having reduced $H_2S$ content from step (b) will simply be separated from the reactant solution, and a spent reactant solution containing sulfur will be recovered. In this case sulfur will be removed from the spent reactant solution containing sulfur, and the spent reactant solution from which sulfur has been removed will be regenerated, producing a reactant solution having an increased concentration of ferric chelate of said acid or acids. The regenerated solution will then be passed to the first contacting zone for use as aqueous reactant solution therein.

In another embodiment, which may be preferred in some situations, the sulfur is separated after regeneration. That is, the spent reactant solution containing sulfur is regenerated, producing a regenerated reactant solution containing sulfur, sulfur is then removed from said regenerated solution, and the regenerated reactant solution from which sulfur has been removed is passed to the first contacting zone for use as the aqueous reactant solution therein. Sulfur may also be removed during regeneration, although this is not preferred.

As used herein, the term "direction of flow", merely refers to the direction the bulk of the gas-solution mixture is proceeding at the respective entrances of the sections at any given time, it being recognized that a minor portion or portions of the mixture may have, at least temporarily, directional movements different from the movement of the bulk or mass of the gas-solution mixture. The acute flow path angles of the channels of a contacting section may vary considerably, but preferably the angles to the direction of flow will range from about 5° to about 60°, most preferably from about 15° to about 45°. Angles approaching 90° are less desirable, since such angles will increase the possibility of sulfur deposition and plugging. A limited amount of "abrupt" change of the flow of the gas-solution mixture may thus be tolerated in the invention, provided the radial mixing and redistribution section or sections of the invention are employed, as described more fully hereinafter. The channels may be oriented in different directions with respect to each other, while maintaining acute angles to the direction of flow. If a channel has a wide acute angle, or if the channel is positioned near the wall or walls of the second contacting zone, the flow of the gas-solution mixture may be directed to and contact the wall or walls of the second contacting zone, and secondary channels, at an obtuse angle to the direction of flow, communicating with these channels, may provide flow of the gas-solution mixture into the radial mixing sections. Preferably, the ratio of the length of the first contacting section to the length of the second contacting zone (length referring to the distance through the zone or section in the direction of flow) is no greater than about 0.5, preferably no greater than about 0.3. As used herein, the term "sulfur deposition resistant" refers to the quality or character of the walls of the discrete channels in being free or at least substantially free of sites where sulfur, present or produced in the gas-solution mixture, may deposit. Such a surface may be produced in the gas-solution mixture, may deposit. Such a surface may be produced by polishing, such as by electropolishing, or it may be formed by coating the surface with a suitable material, such as teflon type materials.

The redistribution section or sections accomplish the important function of redistributing the solution in the gas and inhibiting sulfur deposition. As used herein, the term "operative or adapted to allow radial mixing of gas-solution mixture and redistribution of solution in gas, and to inhibit plugging due to sulfur formation" refers to the requirements that the enclosed redistribution sections (1) do not contain structure, or have limited structure, which would inhibit or prevent radial mixing of gas and solution, and distribution or redistribution of the solution in the gas; (2) will be of sufficient width, and length in the direction of flow, to allow the radial mixing desired and eliminate plugging due to sulfur formation. Given these requirements, and the disclosure herein, those skilled in the art may determine by experimentation the minimum effective width and length of the redistribution section or sections (length referring to the distance through the sections in the direction of flow) and the appropriate ratio of the length of the respective channeled sections to the redistribution sections. In practice, the ratio will preferably range from about 0.1 to about 10, most preferably from about 0.3 to about 4. Normally, the ratio of the length of a given contacting section to the widest dimension of the section will range from about 0.2 to about 5, preferably about 0.3 to about 2. The dimensions of the first contacting zone are not critical, other than that it must be of a size where good distribution of the reactant solution in the gaseous stream is achieved. In this regard, the first contacting zone is an important part of the invention, since good initial intimate mixing of the gas stream and the reactant solution is important for efficiency.

As specified, at least two contacting sections are required in the second contacting zone, but beyond this, the number of additional contacting sections in the second contacting zone is not critical. The number of sections will be determined primarily by the amount of $H_2S$ to be removed and the desired degree of gaseous stream purity. Normally, from 2 to 20 or 30 contacting, channeled sections will suffice, with from 1 to 20 or 30 redistribution sections being sufficient. It is a requirement of the invention that the contacting sections and the radial mixing sections alternate in the sequence of flow, so that sulfur deposition and plugging are eliminated or reduced. The shape of the enclosing walls of the contacting sections is not critical, but a generally cylindrical shape is preferred. The invention is admirably suited for use in the type of structure commonly referred to as a pipeline contactor, and the redistribution sections may simply be open spaces between the sections containing the structured, channeled internals.

It is a preferred aspect of the invention that, by suitable flow rates and design of the channeled sections, the flow of the gas-solution mixture through the second contacting zone will reach or approximate plug flow. Suitable structures for providing the channeled flow include, but are not limited to, chevron-type mixers, such as Koch static mixers or Glitsch Gempak mixers. The velocity of the gas treated may vary widely. Suitable gas velocities may range from about one foot per second to about fifty feet per second, with a range of from about five feet per second to about thirty feet per second being preferred. As noted, the aqueous reactant solution to gas ratio must be sufficient to provide effective removal of $H_2S$ while inhibiting or preventing sulfur deposition in the reaction zones. Preferably, the solution to gas ratio will range from 0.2:100 to 30:100, most preferably from 0.5:100 to 5:100, all by volume. Such ratios will generally be sufficient to provide good wetting of the channel surfaces so that sulfur deposition is inhibited or prevented.

The iron chelates employed are coordination complexes in which irons forms chelates with an acid having the formula

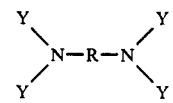

wherein
from two to four of the groups Y are selected from acetic and propionic acid groups;
from zero to two of the groups Y are selected from 2-hydroxyethyl, 2-hydroxypropyl, and

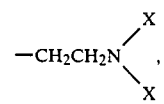

wherein
X is selected from acetic and propionic acid groups; and

R is ethylene, propylene or isopropylene or alternatively cyclohexane or benzene where the two hydrogen atoms replaced by nitrogen are in the 1,2 position, and mixtures thereof.

The iron chelates are supplied in solution as solubilized species, such as the ammonium or alkali metal salts (or mixtures thereof) of the iron chelates. As used herein, the term "solubilized" refers to the dissolved iron chelate or chelates, whether as a salt or salts of the aforementioned cation or cations, or in some other form, in which the iron chelate or chelates exist in solution. Where solubility of the chelate is difficult, and higher concentrations of chelates are desired, the ammonium salt may be utilized, as described in a similar process in commonly assigned, copending U.S. application Ser. No. 769,195, entitled "Process for the Removal of $H_2S$ from Sour Gaseous Streams", filed Aug. 23, 1985, incorporated herein by reference. However, the invention may also be employed with more dilute solutions of the iron chelates, wherein the steps taken to prevent iron chelate precipitation are not critical. Exemplary chelating agents for the iron include aminoacetic acids derived from ethylenediamine, diethylenetriamine, 1,2-propylenediamine, and 1,3-propylenediamine, such as EDTA (ethylenediamine tetraacetic acid), HEEDTA (N-2-hydroxyethyl ethylenediamine triacetic acid), DETPA (diethylenetriamine pentaacetic acid); amino acetic acid derivatives of cyclic, 1,2-diamines, such as 1,2-diamino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. The ferric chelate of N-(2-hydroxyethyl) ethylenediamine triacetic acid is preferred.

The regeneration of the reactant is preferably accomplished by the utilization of oxygen, preferably as air. As used herein, the term "oxygen" is not limited to "pure" oxygen, but includes air, air enriched with oxygen, or other oxygen-containing gases. The oxygen will accomplish two functions, the oxidation of ferrous iron of the reactant to the ferric state, and the stripping of any residual dissolved gas (if originally present) from the aqueous admixture. The oxygen (in whatever form supplied) is supplied in a stoichiometric equivalent or excess with respect to the amount of solubilized iron chelate to be oxidized to the ferric state. Preferably, the oxygen is supplied in an amount of from about 20 percent to about 500 percent excess. Electrochemical regeneration may also be employed.

DETAILED DESCRIPTION OF THE INVENTION

The particular type of sour gaseous stream treated is not critical, the only practical limitation being the reactivity of the stream itself with the solutions employed, as will be evident to those skilled in the art. Streams particularly suited to removal of $H_2S$ by the practice of the invention are, as indicated, naturally-occurring gases, recycled $CO_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled $CO_2$ streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.005 percent to about 10 percent by volume. $CO_2$ may or may not be present, but if present, may range in content from about 0.1 percent to about 99.0 percent (or more) by volume. In this context, the invention may be used to remove $H_2S$ from various $CO_2$ streams, e.g., supercritical $CO_2$ streams. Obviously, the amounts of $H_2S$ and $CO_2$ present are not generally a limiting factor in the practice of the invention. The stream treated may also have been treated initially for $H_2S$ removal, by this or some other technique.

The temperatures employed in the contacting zones are not generally critical, except that the reaction is carried out below the melting point of sulfur. In many commercial applications, such as removal of $H_2S$ from natural gas to meet pipeline specifications, absorption at ambient temperatures is desired. In general, temperatures of from 10° C. to 80° C. are suitable, and temperatures of from 20° C. to 60° C. are preferred. Total contact times may be varied widely, but will preferably range from about 0.5 second to about 10 seconds, with total contact times of about 1 second to about 5 seconds being most preferred.

Similarly, in the regeneration or stripping zone or zones, temperatures may be varied widely. Preferably, the regeneration zone should be maintained at somewhat lower temperatures compared to the contacting zone. In general, temperatures of from about 10° C. to 80° C., preferably 20° C. to 50° C., may be employed.

Pressure conditions in the contacting zones may vary widely, depending on the pressure of the gas to be treated. For example, pressures in the contacting zones may vary from one atmosphere up to one hundred fifty or even two hundred atmospheres. Pressures of from one atmosphere to about one hundred atmospheres are preferred. In the regeneration zone, pressures may be varied considerably, and will preferably range from about one atmosphere to about three or four atmospheres. Residence times for given volumes of admixture and oxygen will also vary, but preferably will range from about 1 minute to about 60 minutes, most preferably from about 1 minute to about 40 minutes. The pressure, fluid flow, and temperature relationships involved are well understood by those skilled in the art, and need not be detailed herein. Other conditions of operation for this type of reaction process are further described in U.S. Pat. No. 3,068,065 to Hartley et al, dated Dec. 11, 1962, incorporated herein by reference, and in the aforementioned application. Preferably, pH in the regeneration zone will range from about 6.5 to about 8.5, and the molar ratio of the acid or acids to total solubilized iron is from about 1.0 to 1.5. The process is preferably conducted continuously.

As indicated, the $H_2S$, when contacted, is rapidly converted in the process of the invention by the solubilized ferric chelate of the above-mentioned acid or acids to solid elemental sulfur. Since the ferrous chelates per se have limited solubility in water, the iron chelate compound or compounds are preferably supplied, as indicated previously. The amount of solubilized ferric chelate supplied or employed in solution is an amount sufficient to reduce the $H_2S$ concentration or content of the stream to the desired level. If total or substantially total removal is desired, the total amount supplied will generally be on the order of at least about two mols per mol of $H_2S$. Ratios of from about 2 mols to about 15 mols of solubilized ferric chelate of specified acid or acids per mol of $H_2S$ may be used, with ratios of from about 2 mols per mol to about 5 mols of solubilized ferric chelate per mol of $H_2S$ being preferred. The molar ratio of the ferric chelate of the acid or acids present to the ferrous chelate of said acid or acids in the contacting solution will normally be less than about 6, and will preferably range from about 0.2 to about 6, most preferably about 0.5 to about 6. The chelate solution will generally be supplied as an aqueous solution having a concentration of from about 0.1 molar to about 3 molar; a concentration of from about 0.5 to about 1.5 molar is preferred. The total iron concentration, as the chelates, will range from about 0.01 percent, preferably about 0.5 percent, to about 7 percent by weight, based on the weight of the solution and the iron. As indicated, the solubilized iron chelates may be formed in aqueous solution by the reaction of elemental iron or of an appropriate salt, oxide, or hydroxide of iron and specified acid, in the presence of alkali metal or ammonium ions, or with the ammonium or alkali metal salt.

BRIEF DESCRIPTION OF THE DRAWING

In order to describe the invention in greater detail, reference is made to the accompanying schematic drawing. The drawing illustrates an embodiment of the invention wherein the sour gas contacting zones are vertically disposed, sulfur removal is accomplished in a separate step before regeneration, and regenerated solution is returned to the zone for use as the contacting solution, in the illustrative embodiment hereinafter. All values are calculated or merely exemplary, and all flows, unless stated otherwise, are continuous.

ILLUSTRATIVE EMBODIMENT

As shown, sour gas, e.g., a natural gas stream containing about 0.5 percent $H_2S$, in line (1) flows into generally cylindrical column (2) wherein it is intimately contacted in zone (3) thereof with a spray of an aqueous mixture from line (4) which comprises aqueous 0.6 M solution of ammonium ferric N-(2-hydroxyethyl)ethylene diamine triacetate chelate, which mixture also contains 0.2 moles per liter of ammonium ferrous N-(2-hydroxyethyl)ethylene diamine triacetate chelate and about 0.25 moles per liter of ammonium thiosulfate, pH of the solution being adjusted to 7.5 to 8 by the addition of ammonium hydroxide. The solution is produced by utilization of the reducing effect of the $H_2S$ in the gaseous stream. That is, the initial solution employed in the contacting zone illustrated is a 0.8 M aqueous solution of ferric N-(2-hydroxyethyl)ethylene diamine triacetate chelate also containing sufficient added ammonium hydroxide to maintain the pH of the solution at 6.5 to 8.5. After startup, and reaction with $H_2S$ in the gaseous stream, regeneration, described hereinafter, is controlled, so that regeneration of the ammonium ferric chelate is not complete, in the ratios mentioned.

In zone (3), the gas stream containing $H_2S$ and the aqueous reactant mixture are intimately mixed to form a gas-reactant liquid mixture, sulfur almost immediately forming, and the gas-reactant liquid mixture is passed downwardly in cocurrent relationship to the first section (5) of contacting zone (6). Although a spray column is illustrated, other suitable devices or techniques which provide intimate mixing or contacting of the gas and aqueous reactant mixture may be employed. For example, sparging units, cone sprayers, as well as venturis, may be utilized to produce a well mixed gas-solution or liquid mixture. In any event, contacting section (5) comprises a chevron type flow directing element which provides a plurality of discrete channels for the passage and direction of the gas-reactant liquid mixture at a 30° angle to the direction of flow to the side of the cylindrical column. In this illustration, the element used is a Koch SMV ® mixing element. To insure that the surfaces of the channels are resistant to sulfur deposition, the mixing element [and all those described hereinafter for zone (6)] are electropolished before use. While these elements have commonly been previously proposed for use in series, misoriented with respect to each other, for turbulent flow, the object in the present case is to avoid abrupt change in direction of the flow by the provision of spacing between succeeding elements, so that at least substantial plug flow overall through zone (6) is obtained. The superficial velocity of the gas is 20 ft/second, and the liquid to gas volumetric flow ratio is 2:100. The width of the channels of the element (5) is about 1 inch, and the diameter of the column is about 12 inches. The length of element (5) in the direction of flow is about 12 inches. As indicated, other types of elements may be employed. At the outlets of the channels of element (5), gas-reactant liquid mixture from the channels enters an open section (7) (also about 12 inches in length in the direction of flow) of contacting zone (6) where gas-liquid reactant mixture may mix radially and where redistribution of solution and gas occurs. The open section also inhibits plugging, due to sulfur formation, which might occur if multiple chevron elements were placed end to end. The gas-reactant liquid mixture, with increasing solid sulfur content, passes through chevron element (8), which is identical to element (5). Element (8) may or may not be misoriented with respect to element (5).

The gas-reactant liquid mixture, upon leaving the channels of element (8), passes through redistribution section (9), where the dimensions and operation are similar to that occurring in section (7). The flow of the gas-reactant liquid mixture through the remaining corresponding sections of zone (6) is similar to that described with respect to the first four sections, and need not be described, except to note that the $H_2S$ in the gas stream is continually being reduced, with concomitant sulfur formation and reduction of the $Fe+++$ chelate concentration.

At the lower end of column (2), the gas-reactant liquid mixture, now containing solid sulfur, passes from vessel (2), and is sent via line (10) to a separating unit or vessel (11) where the natural gas is separated from the liquid and sulfur. Purified natural gas is removed overhead via line (12), and "spent" reactant liquid and sulfur are removed via line (13).

As those skilled in the art will recognize, solution concentrations, sulfur content, and ferric-ferrous ligand concentrations and ratios must be regulated to achieve appropriate $H_2S$ removal. To maintain appropriate ferric concentrations and provide sulfur removal, stream (13) is sent for regeneration and sulfur removal.

More particularly, the aqueous admixture in line (13) is sent to a depressurization and degassing unit (14), which also serves as a sulfur concentration or thickening zone. A minor portion, e.g., 2 to 5 percent by volume of the admixture in settler or thickener (14), and containing an increased sulfur concentration, is continuously withdrawn from the lower portion of settler or concentrator (14) and sent via line (15) to sulfur recovery in unit (16).

Sulfur recovery may be accomplished in any suitable fashion, such as by filtration. For example, sulfur may also be recovered by that method described in commonly assigned copending application Ser. No. 769,197, entitled "Sulfur Separation Process", filed Aug. 23, 1985, incorporated herein by reference. As those skilled in the art will recognize, sulfur may be removed after regeneration, if desired. In any event, solution recovered during sulfur recovery may be returned to any suitable point in the process, if proper adjustment is made. Preferably, however, the solution recovered is sent to the regeneration zone, as shown, via lines (17) and (18).

The major portion of the aqueous admixture in vessel (14) is removed via line (18) for regeneration of the ferric chelate of N-(2-hydroxyethyl)ethylenediamine triacetic acid. In regeneration zone or column (19), which may be a sparged tower, the admixture is contacted cocurrently with excess air in line (20) to convert ferrous chelate of N-(2-hydroxyethyl)ethylenediamine triacetic acid to ferric chelate of N-(2-hydroxyethyl)ethylene diamine triacetic acid. Air velocity in the regenerator is in the range of 0.1 to 0.3 feet per second, the temperature of the liquid is about 45° C., and overall pressure is about 2 atmospheres. Spent air is removed via line (21), and regenerated admixture, having a ratio of ferric chelate of N-(2-hydroxyethyl)ethylenediamine triacetatic acid to ferrous chelate of N-(2-hydroxyethyl)ethylenediamine triacetic acid of about 3, is returned via line (22) to line (4), which connects, as mentioned, to column (2).

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which are beneficial, and other additives, such as additives to improve sulfur separation, or antifoaming and/or wetting agents, may be employed.

What is claimed is:

1. A process for the removal of $H_2S$ from a sour gaseous stream comprising;

(a) feeding the sour gaseous stream to a first contacting zone, and intimately contacting the sour gaseous stream in said first contacting zone with an aqueous reactant solution containing solubilized ferric chelate of an acid having the formula

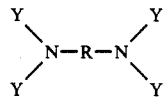

wherein from two to four of the groups Y are selected from acetic and propionic acid groups;

from zero to two of the groups Y are selected from 2-hydroxyethyl, 2-hydroxypropyl, and

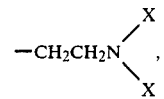

wherein x is selected from acetic acid and propionic acid groups; and

R is ethylene, propylene or isopropylene or alternatively cyclohexane or benzene where the two hydrogen atoms replaced by nitrogen are in the 1,2-position, and mixtures thereof, and the solubilized ferrous chelate of said acid or acids, at a temperature below the melting point of sulfur, and at a sufficient solution to gas ratio and conditions effective to convert $H_2S$ to sulfur and inhibit sulfur deposition, and producing a gas-solution mixture comprising sour gas and aqueous reactant solution;

(b) passing gas-solution mixture from step (a) through a plurality of enclosed contacting sections in serial flow communication in a second contacting zone, under conditions to convert $H_2S$ to sulfur and at a temperature below the melting point of sulfur, the first contacting section of said second contacting zone comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; the second contacting section through which gas-solution mixture is passed comprising an enclosed mixing section adapted to allow radial mixing of gas-solution mixture and redistribution of solution in gas, and to inhibit plugging due to sulfur formation; the third contacting section through which gas-solution mixture is passed comprising a plurality of discrete sulfur deposition resistant channels, each discrete channel providing a diverted flow path for gas solution mixture through the section, such that gas-solution mixture is directed at least initially at an angle acute to that of the direction of flow of the gas-solution mixture entering the section; and producing a gas-reactant solution mixture containing solid sulfur in said second contacting zone, the reactant solution of said gas-reactant solution mixture having a reduced content of solubilized ferric chelate of said acid or acids and the gas of said mixture having a reduced $H_2S$ content;

(c) separating the gas having reduced $H_2S$ content from gas-reactant solution mixture produced in step (b).

2. The process of claim 1 wherein the gas having reduced $H_2S$ content from step (c) is contacted with additional aqueous reactant solution containing solubilized ferric chelate of said acid or acids, at a temperature below the melting point of sulfur and under conditions effective to convert $H_2S$ to sulfur, in at least one additional contacting zone, and a gas having further reduced $H_2S$ content and a solution having a reduced content of the solubilized ferric chelate of said acid or acids are produced.

3. The process of claim 2 wherein at least one of said additional contacting zone or zones comprises a spraying zone wherein the gas having reduced H₂S content is passed countercurrently through a spray of said additional reactant solution.

4. The process of claim 3 wherein the solution having a reduced content of the ferric chelate of said acid or acids and the solution having a reduced content of said acid or acids from said additional contacting zone or zones are regenerated in a regeneration zone.

5. The process of claim 1 wherein the number of contacting sections comprising a plurality of discrete sulfur deposition resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

6. The process of claim 2 wherein the number of contacting sections comprising a plurality of discrete sulfur deposiion resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

7. The process of claim 3 wherein the number of contacting sections comprising a plurality of discrete sulfur deposition resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

8. The process of claim 4 wherein the number of contacting sections comprising a plurality of discrete sulfur deposition resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

9. A process for the removal of H₂S from a sour gaseous stream comprising;
(a) feeding the sour gaseous stream to a first contacting zone, and intimately contacting the sour gaseous stream in said first contacting zone with an aqueous reactant solution containing solubilized ferric chelate of an acid having the formula

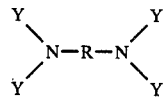

wherein
from two to four of the groups Y are selected from acetic and propionic acid groups;
from zero to two of the groups Y are selected from 2-hydroxyethyl, 2-hydroxypropyl, and

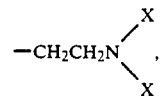

wherein
x is selected from acetic acid and propionic acid groups; and
R is ethylene, propylene or isopropylene or alternatively cyclohexane or benzene where the two hydrogen atoms replaced by nitrogen are in the 1,2-position, and mixtures thereof, and the solubilized ferrous chelate of said acid or acids, at a temperature below the melting point of sulfur, and at sufficient solution to gas ratio and conditions effective to convert H₂S to sulfur and inhibit sulfur deposition, and producing a gas-solution mixture comprising sour gas and aqueous reactant solution;

(b) passing gas-solution mixture from step (a) through a plurality of enclosed contacting sections in serial flow communication in a second contacting zone, under conditions to convert H₂S to sulfur and at a temperature below the melting point of sulfur, the first contacting section of said second contacting zone comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; the second contacting section through which gas-solution mixture is passed comprising an enclosed mixing section adapted to allow radial mixing of gas-solution mixture and redistribution of solution in gas, and to inhibit plugging due to sulfur formation, the third contacting section through which gas-solution mixture is passed comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; and producing a gas-reactant solution mixture containing solid sulfur in said second contacting zone, the reactant solution of said gas-reactant solution mixture having a reduced content of solubilized ferric chelate of said acid or acids and the gas of said mixture having a reduced H₂S content;

(c) separating the gas having reduced H₂S content from gas-reactant solution mixture produced in step (b), and recovering a spent reactant solution containing sulfur;

(d) removing sulfur from said spent reactant solution containing sulfur;

(e) regenerating spent reactant solution from which sulfur has been removed, producing a reactant solution having an increased concentration of ferric chelate of said acid or acids; and (f) passing regenerated solution from step (e) to the first contacting zone for use as aqueous reactant solution therein.

10. The process of claim 9 wherein the number of contacting sections comprising a plurality of discrete sulfur deposition resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

11. A process for the removal of H$_2$S from a sour gaseous stream comprising;

(a) feeding the sour gaseous stream to a first contacting zone, and intimately contacting the sour gaseous stream in said first contacting zone with an aqueous reactant solution containing solubilized ferric chelate of an acid having the formula

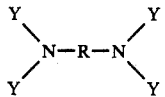

wherein
from two to four of the groups Y are selected from acetic and propionic acid groups;
from zero to two of the groups Y are selected from 2-hydroxyethyl, 2-hydroxypropyl, and

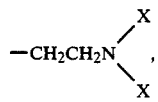

wherein
x is selected from acetic acid and propionic acid groups; and
R is ethylene, propylene or isopropylene or alternatively cyclohexane or benzene where the two hydrogen atoms replaced by nitrogen are in the 1,2-position, and mixtures thereof, and the solubilized ferrous chelate of said acid or acids, at a temperature below the melting point of sulfur, and at sufficient solution to gas ratio and under conditions to convert H$_2$S to sulfur and inhibit sulfur deposition, and producing a gas-solution mixture comprising sour gas and aqeous reactant solution;

(b) passing gas-solution mixture from step (a) through a plurality of enclosed contacting sections in serial flow communication in a second contacting zone, under conditions to convert H$_2$S to sulfur and at a temperature below the melting point of sulfur, the first contacting section of said second contacting zone comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; the second contacting section through which gas-solution mixture is passed comprising an enclosed mixing section adapted to allow radial mixing of gas-solution mixture and redistribution of solution in gas, and to inhibit plugging due to sulfur formation; the third contacting section through which gas-solution mixture is passed comprising a plurality of discrete sulfur deposition resistant channels, each discrete channel providing a diverted flow path for gas-solution mixture through the section, such that gas-solution mixture is directed at least initially at an angle acute to that of the direction of flow of the gas-solution mixture entering the section; and producing a gas-reactant solution mixture containing solid sulfur in said second contacting zone, the reactant solution of said gas-reactant solution mixture having a reduced content of solubilized ferric chelate of said acid or acids and the gas of said mixture having a reduced H$_2$S content;

(c) separating the gas having reduced H$_2$S content from gas-reactant solution mixture produced in step (b), and recovering a spent reactant solution containing sulfur;

(d) regenerating spent reactant solution, producing a regenerated solution containing sulfur and having an increased concentration of ferric chelate of said acid or acids;

(e) removing sulfur from said regenerated solution containing sulfur; and (f) passing regenerated solution from which sulfur has been removed from step (e) to the first contacting zone for use as aqueous reactant solution therein.

12. The process of claim 17 wherein the number of contacting sections comprising a plurality of discrete sulfur deposition resistant channels is from 2 to 30, and the number of contacting sections comprising an enclosed mixing section is from 1 to 30, the contacting sections comprising channels and the enclosed mixing sections adapted to allow radial mixing alternating in the sequence of flow of the gas-solution mixture through the second contacting zone.

13. The process of claim 1 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

14. The process of claim 2 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

15. The process of claim 5 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

16. The process of claim 6 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

17. The process of claim 8 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

18. The process of claim 11 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

19. The process of claim 12 wherein the solubilized ferric chelate is ammonium ferric N-(2-hydroxyethyl)ethylenediamine triacetate chelate and the solubilized ferrous chelate is ammonium ferrous N-(2-hydroxyethyl)-ethylenediamine triacetate chelate.

* * * * *